US012257201B1

(12) United States Patent
Zhang

(10) Patent No.: US 12,257,201 B1
(45) Date of Patent: Mar. 25, 2025

(54) URINE COLLECTOR

(71) Applicant: Wei Zhang, Ladera Ranch, CA (US)

(72) Inventor: Wei Zhang, Ladera Ranch, CA (US)

( * ) Notice: Subject to any disclaimer, the term of this patent is extended or adjusted under 35 U.S.C. 154(b) by 0 days.

(21) Appl. No.: 18/953,391

(22) Filed: Nov. 20, 2024

(51) Int. Cl.
*A61G 9/00* (2006.01)

(52) U.S. Cl.
CPC .................................... *A61G 9/006* (2013.01)

(58) Field of Classification Search
CPC ...................................................... A61G 9/006
USPC .............................................................. 4/463
See application file for complete search history.

(56) References Cited

U.S. PATENT DOCUMENTS

2007/0225668 A1* 9/2007 Otto ....................... A61G 9/006 604/347
2009/0260140 A1* 10/2009 Birbara .................. A47K 11/12 4/144.1
2012/0066825 A1* 3/2012 Birbara .................. A47K 11/12 4/309
2013/0036544 A1* 2/2013 Lee ........................ A61G 9/003 4/443
2016/0113809 A1* 4/2016 Kim ..................... A61G 5/1002 604/347
2017/0020760 A1* 1/2017 Sang .......................... E03D 9/08
2020/0383855 A1* 12/2020 Drakeford .............. A61G 9/006
2024/0148541 A1* 5/2024 Athalye ................. A61G 9/006

* cited by examiner

*Primary Examiner* — Huyen D Le
(74) *Attorney, Agent, or Firm* — Daniel M. Cohn; Howard M. Cohn

(57) ABSTRACT

A urine collector includes a host, a urine collecting container, and a wearable assembly. The host includes a housing, suction pumps, and an electronic control module. The urine collecting container is detachably mounted on the housing and is communicated with the suction pumps. The wearable assembly includes a wearable piece, suction hoses, and first liquid sensors. The wearable piece includes a cup body and a cup cover, the cup cover is detachably connected to the cup body. The cup cover is connected to the cup body to define an accommodating cavity. The cup cover is an elastic piece and defines a through hole. The first liquid sensors are fixedly disposed on the cup body. The suction hoses are connected to the cup body. The electronic control module is configured to control the suction pumps to work simultaneously when the first liquid sensors sense a liquid.

20 Claims, 12 Drawing Sheets

URINE COLLECTOR

TECHNICAL FIELD

The present disclosure relates to a technical field of nursing equipment, in particular to a urine collector.

BACKGROUND

For male patients who have limited mobility and are confined to bed, assistance is needed when the male patients need to urinate. If the male patients rely on the assistance of family members or caregivers to urinate, it brings a burden on the family members or the caregivers. When using a catheter to assist the male patients to urinate, it is often accompanied by pain and discomfort. When using diapers to assist the male patients to urinate, the diapers need to be replaced frequently. In addition, the diapers are prone to breed bacteria in a process of absorbing urine, posing a threat to health of the male patients.

A urine collector commonly comprises a suction pump and a sensor, which are capable of automatically sucking the urine when a user urinates. However, in the related art, in order to improve airtightness when wearing, a structure of a wearing assembly of the urine collector is complicated and is larger in size, which causes discomfort to the user.

SUMMARY

The present disclosure provides a urine collector that improves a comfort and convenience of a user when wearing the urine collector while reducing a risk of urine leakage.

The present disclosure provides a urine collector. The urine collector comprises a host, a urine collecting container, and a wearable assembly.

The host comprises a housing, suction pumps, and an electronic control module. The suction pumps and the electronic control module are mounted in the housing. The suction pumps are controlled by the electronic control module. The urine collecting container is detachably mounted on the housing and is communicated with the suction pumps. The wearable assembly comprises a wearable piece, suction hoses, and first liquid sensors. The wearable piece comprises a cup body and a cup cover, the cup cover is detachably connected to the cup body. The cup cover is connected to the cup body to define an accommodating cavity, the cup cover is an elastic piece and defines a through hole. The through hole allows a penis to extend into. The cup cover is capable of connecting to the penis by a tensioning force. The first liquid sensors are fixedly disposed on the cup body. The suction hoses are connected to the cup body. The electronic control module is configured to control the suction pumps to work simultaneously when the first liquid sensors sense a liquid.

In some embodiments, a flange is disposed on a top portion of the cup body. The flange extends in a radial direction of the cup body. The cup cover comprises a main body portion and an extension portion. The extension portion is connected to an edge of the main body portion and extended towards one side of the main body portion. An annular groove is defined on an inner side of the extension portion. The flange is clamped in the annular groove.

In some embodiments, the cup cover comprises a main body portion and an extension plate connected to one side of the main body portion, and the extension plate and the main body portion jointly form a hole wall of the through hole.

In some embodiments, first connecting tubes are disposed on a bottom portion of the cup body, and the suction hoses are respectively connected to the first connecting tubes to be communicated with the accommodating cavity.

In some embodiments, the wearable piece further comprises extension tubes and baffles. A first end of each of the extension tubes is connected to a corresponding one of the first connecting tubes and is located in the accommodating cavity, and a second end of each of the extension tubes extends in a direction toward the cup cover. The baffles are fixed to the cup body; each of the baffles is at least partially located between the cup cover and the second end of a corresponding one of the extension tubes. An interval is fixedly defined between each of the baffles and the second end of the corresponding one of the extension tubes.

In some embodiments, mounting portions are disposed on an inner wall of the cup body. The mounting portions comprise mounting grooves. The extension tubes and the first liquid sensors are mounted in the mounting grooves. Each of the first liquid sensors is located on one side of a corresponding one of the extension tubes.

In some embodiments, two suction pumps, two first liquid sensors, and two suction pumps are provided. When any one of the first liquid sensors senses the liquid, the electronic control module controls the two suction pumps to work simultaneously. Two first connecting tubes are provided, and the two first connecting tubes are disposed at intervals at the bottom portion of the cup body. The cup body defines a first central axis and a second central axis with respect to a bottom surface of the cup body. The first central axis is perpendicular to the second central axis. The two first connecting tubes are located on one side of the first central axis and are respectively located on two sides of the second central axis. Each of the suction hoses is communicated with a corresponding one of the suction pumps and a corresponding one of the first connecting tubes. Each of the first liquid sensors is disposed corresponding to a corresponding one of the first connecting tubes.

In some embodiments, the housing comprises second connecting tubes and a third connecting tube. The urine collector further comprises two communicating tubes, a urine collecting tube, and a three-way joint. Liquid inlet ends of the communicating tubes are respectively communicated with liquid outlet ends of the suction pumps. Liquid outlet ends of the communicating tubes are connected to the three-way joint. The three-way joint is connected to the third connecting tube. The urine collecting tube is connected to the third connecting tube, and the urine collecting tube communicates the urine collecting container to the third connecting tube.

In some embodiments, the urine collector further comprises conductive wires, and the first liquid sensors are electrically connected to the electronic control module through the conductive wires.

In some embodiments, the first liquid sensors are conductivity sensors, and/or the urine collector further comprises fastening pieces, and the fastening pieces fix the two suction hoses to the conductive wires.

In some embodiments, the cup body further comprises a cover plate. An accommodating groove is defined on a bottom portion of the cup body. Two conductive wires are provided. The cover plate covers an opening of the accommodating groove, so that the two conductive wires are at least partially fixed in the accommodating groove. One end of each of the conductive wires are electrically connected to a corresponding one of the first liquid sensors. At least portions of the two conductive lines outside the accommodating groove are wrapped into a cable.

In some embodiments, a second liquid sensor is disposed in the urine collecting container, and the second liquid sensor is electrically connected to the electronic control module.

In some embodiments, the host further comprises an alarm. The alarm is electrically connected to the electronic control module, and the electronic control module is configured to control the alarm to work when the second liquid sensor detects the liquid.

In some embodiments, a total capacity of the urine collecting container is not less than 1830 milliliter (mL) and not greater than 2200 mL. The electronic control module is configured to control the alarm to work when the second liquid sensor detects that a volume of the liquid in the urine collecting container is 75% to 85% of the total capacity of the urine collecting container.

In some embodiments, an exhaust tube is disposed on a top portion of the urine collecting container, the exhaust tube communicates an interior of the urine collecting container with an outside of the urine collecting container.

In some embodiments, the housing defines a receiving groove, and the urine collecting container is detachably mounted in the receiving groove.

In some embodiments, the housing comprises a bottom shell and an upper shell. The upper shell defines the receiving groove and is enclosed with the bottom shell to form a mounting space. The suction pumps and the electronic control module are mounted in the mounting space.

In some embodiments, the housing comprises second connecting tubes. Each of the suction hoses comprises a first hose section and a second hose section. The first hose section of each of the suction hoses is communicated with the second hose section of each of the suction hoses through a corresponding one of the second connecting tubes. Both of the first hose section of each of the suction hoses and the second hose section of each of the suction hoses are detachably connected to the corresponding one of the second connecting tubes, In some embodiments, the urine collector further comprises a battery, a display device and a button. The battery is configured to supply power to the electronic control module, the suction pumps, and the first liquid sensors. The display device is electrically connected to the electronic control module. The display device is configured to indicate a power level of the battery. The button is mounted on an outer surface of the housing and is electrically connected to the electronic control module.

In some embodiments, the display device is an indicator light, and the indicator light indicates different power levels by emitting lights of different colors. Alternatively, the indicator light comprises lamp beads, and different power levers are indicated by controlling different numbers of the lamp beads to emit light.

Based on the urine collector of the embodiments of the present disclosure, when the user urinates, the urine enters the accommodating cavity of the wearable piece. When any one of the first liquid sensors senses the urine, a signal is sent to the electronic control module. After receiving the signal, the electronic control module immediately controls the two suction pumps to simultaneously work. The two suction pumps generate negative pressure to suck the urine from the accommodating cavity of the wearable piece through the suction hoses into the urine collecting container. When the urine is completely sucked into the urine collecting container, that is, when the first liquid sensors do not sense the urine, the electronic control module controls the two suction pumps to stop working. The cup cover of the present disclosure is the elastic piece with a certain elasticity, so the cup cover is capable of connecting to the penis only by the tensioning force without any additional fixing device. The urine collector is relatively simple to use and improves the airtightness of the cup body and the cup cover, thereby reducing the risk of urine leakage. The urine collecting container of the present disclosure is detachable, which is convenient for a caregiver to pour out the urine stored therein and clean the urine collecting container.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

REFERENCE NUMBERS IN THE DRAWINGS

Figure 1:
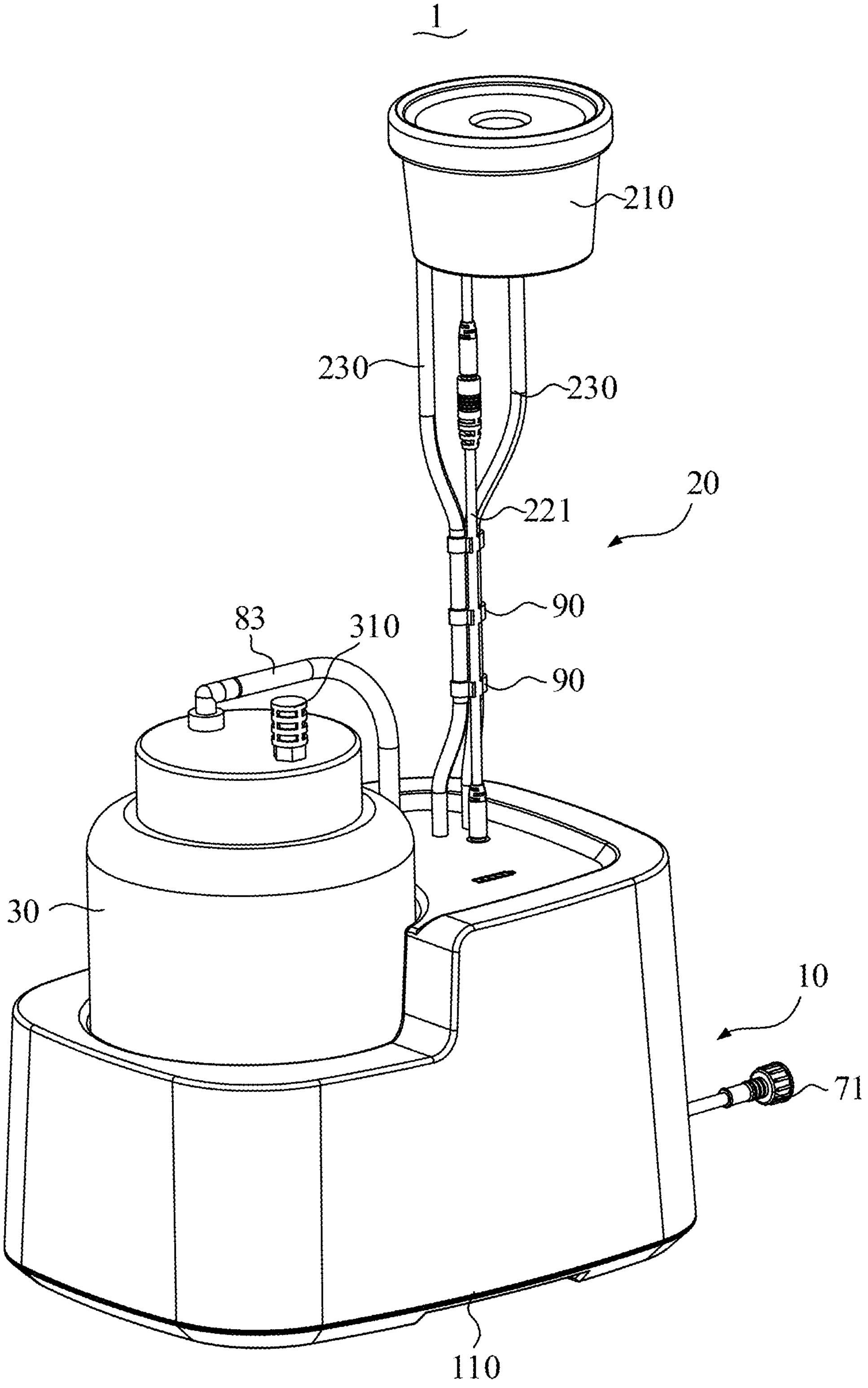
FIG. 1 is a perspective structural schematic diagram of a urine collector according to one embodiment of the present disclosure.

1—urine collector; 10—host; 110—housing; 110A—receiving groove; 110B—mounting space; 111—bottom shell; 112—upper shell; 113—second connecting tube; 114—third connecting tube 120—suction pump; 130—electronic control module; 20—wearable assembly; 210—wearable piece; 210A—accommodating cavity; 211—cup body; 2111—flange; 2112—first connecting tube; 2113—mounting portion; 2114—mounting groove; 2115—cover plate; 2116—accommodating groove; 212—cup cover; 212A—through hole; 2121—main body portion; 2122—extension portion; 2123—annular groove; 2124—extension plate; 213—extension tubes; 214—baffle; 220—first liquid sensor; 221—conductive wire; 230—suction hose; 231—first hose section; 232—second hose section; 30—urine collecting container; 310—exhaust tube; 40—second liquid sensor; 50—battery; 60—indicator light; 71—power adapter; 72—button; 83—urine collecting tube; 90—fastening piece.

Realization of purposes, functional features, and advantages of the present disclosure is further explained in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as “first” and “second” are only used for the purpose of description, rather than being understood to indicate or imply relative importance or hint the number of indicated technical features. Thus, the feature limited by “first” and “second” can explicitly or impliedly comprise at least one feature. Unless otherwise indicated, the term “a plurality of” means two or more. The term “and/or” depict relationship between associated objects and there are three relationships thereon. For example, A and/or B may indicate A exists alone, A and B exist at the same time, and B exists alone. The character “/” generally indicates that the associated object is alternative. The terms “first”, “second”, “third”, etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term “and/or” comprises any and all combinations of one or more of the associated listed items.

Figure 2:
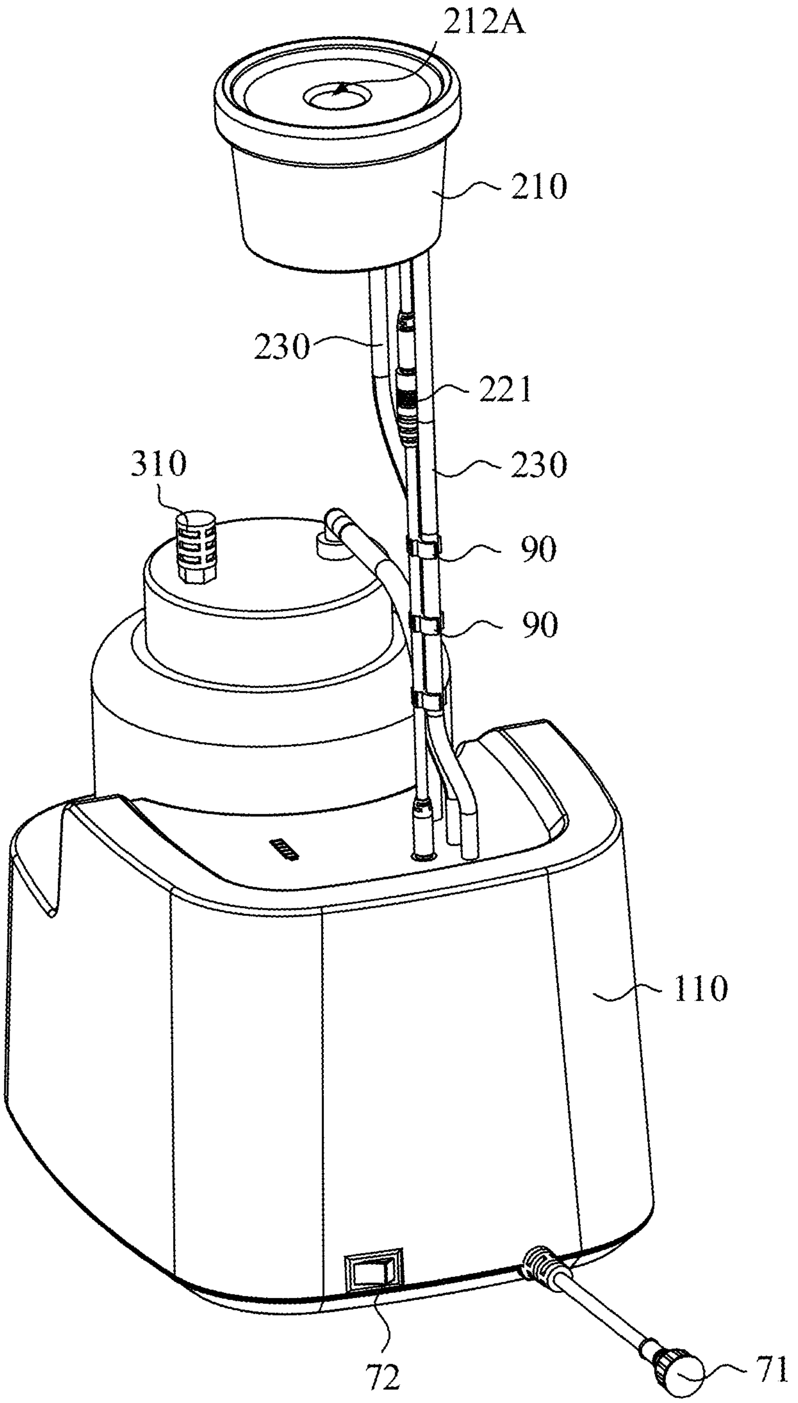
FIG. 2 is another perspective structural schematic diagram of the urine collector according to one embodiment of the present disclosure.
Figure 3:
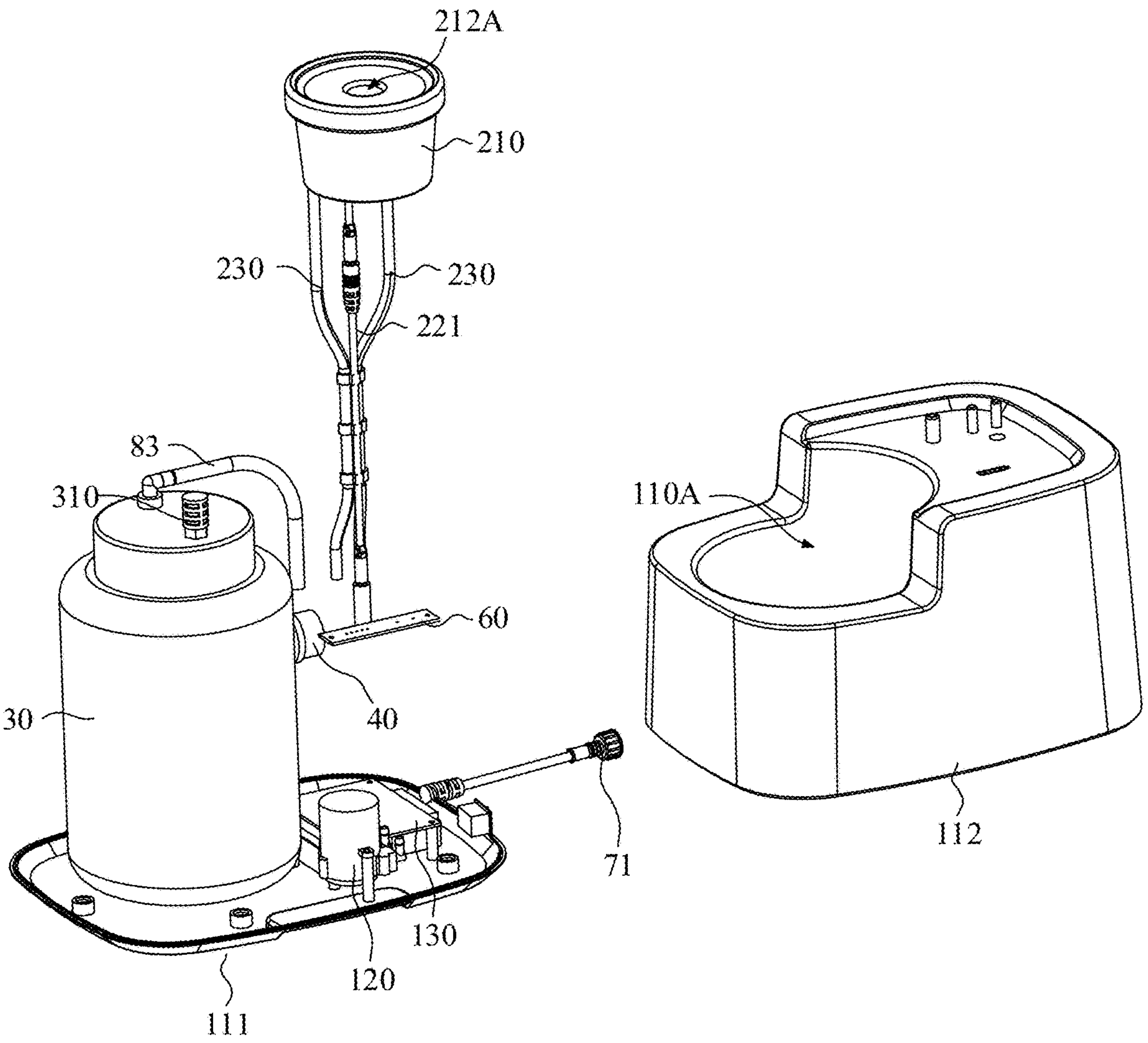
FIG. 3 is an exploded schematic diagram of the urine collector according to one embodiment of the present disclosure.
Figure 4:
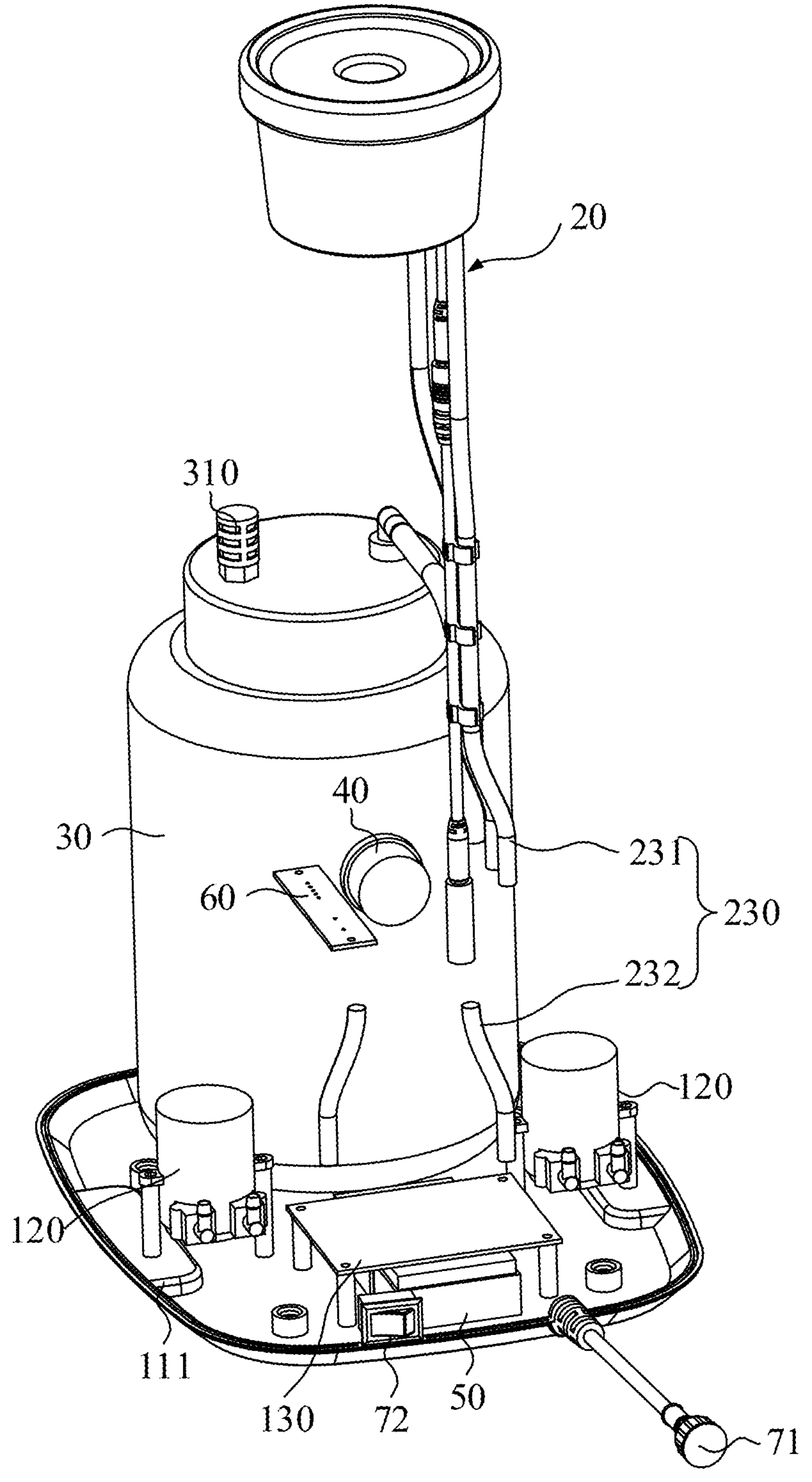
FIG. 4 is an exploded schematic diagram of the urine collector according to one embodiment of the present disclosure, where an upper shell is removed.

As shown in FIGS. 1 and 2, the present disclosure provides a urine collector 1. The urine collector 1 comprises a host 10, a urine collecting container 30, and a wearable assembly 20. As shown in FIGS. 3 and 4, the host 10 comprises a housing 110, suction pumps 120, and an electronic control module 130. The suction pumps 120 and the electronic control module 130 are mounted in the housing 110. The suction pumps 120 are controlled by the electronic control module 130. The electronic control module 130 may be a circuit board. The urine collecting container 30 is detachably mounted on the housing 110 and is communicated with the suction pumps 120.

Figure 7:
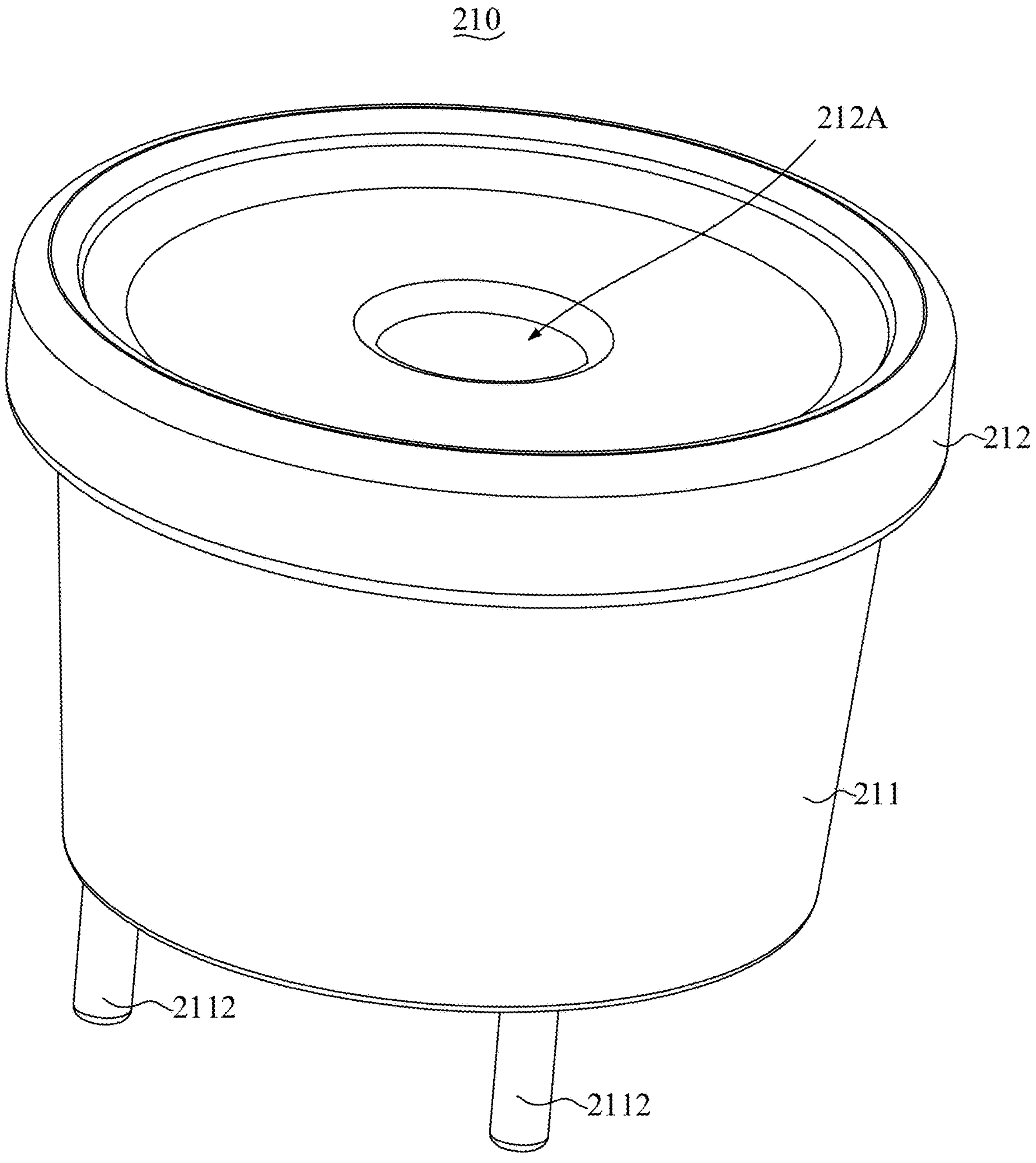
FIG. 7 is a structural schematic diagram of a wearable piece according to one embodiment of the present disclosure.
Figure 8:
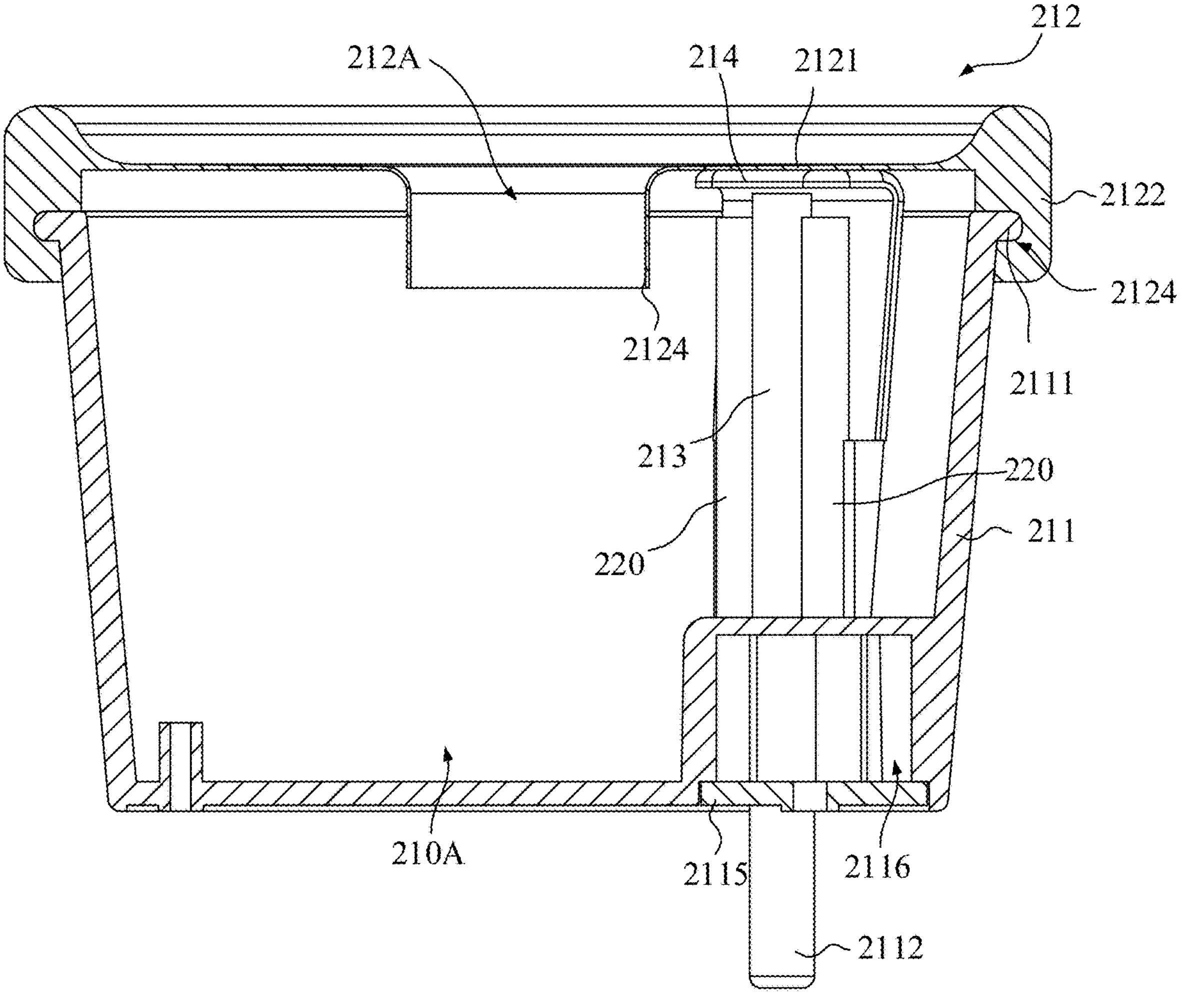
FIG. 8 is a cross-sectional schematic diagram of the wearable piece according to one embodiment of the present disclosure.

As shown in FIGS. 3, 7, and 8, the wearable assembly 20 comprises a wearable piece 210, suction hoses 230, and first liquid sensors 220. The wearable piece 210 is configured to be worn on the penis. The wearable piece 210 comprises an accommodating cavity 210A configured to store urine. The suction hoses 230 are connected to the wearable assembly 210 and is communicated with the accommodating cavity 210A. A liquid outlet end of each of the suction hoses 230 is connected to a corresponding one of the suction pumps 120. The first liquid sensors 220 are mounted in the accommodating cavity 210A and are controlled by the electronic control module 130. Each of the first liquid sensors 220 is disposed corresponding to the liquid inlet end of a corresponding one of the suction hoses 230. The electronic control module 130 is configured to control the suction pumps 120 to work simultaneously when the first liquid sensors 220 senses a liquid.

Figure 9:
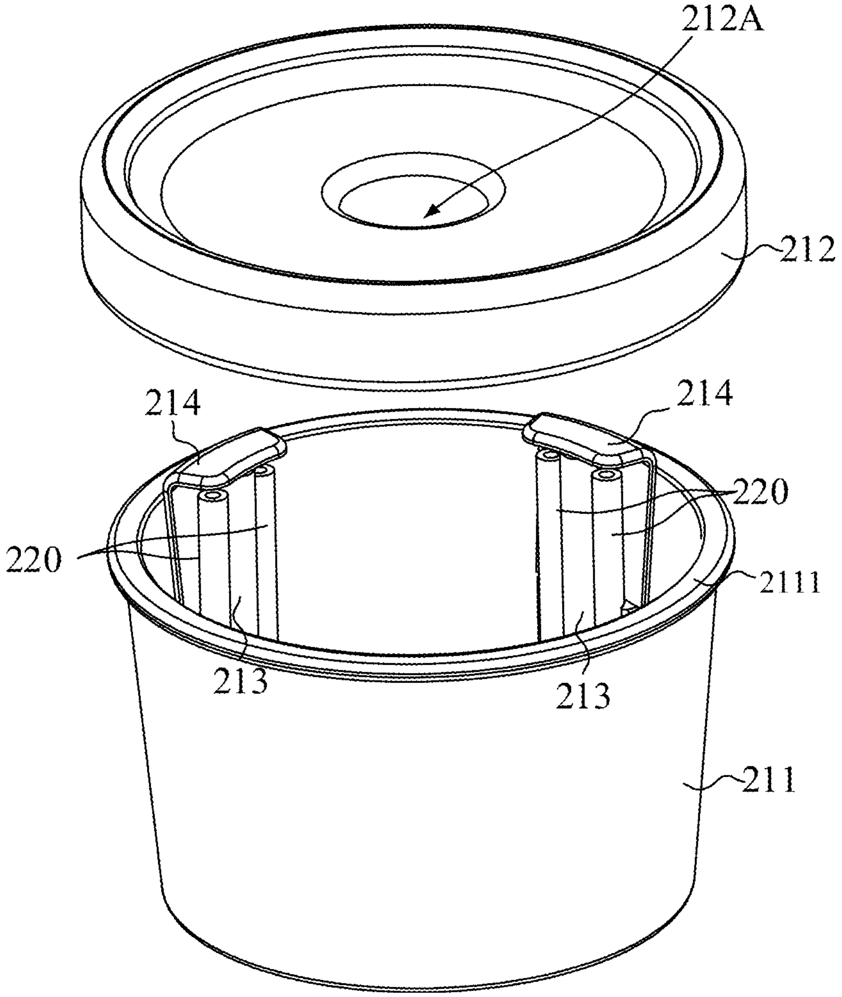
FIG. 9 is an exploded schematic diagram of the wearable piece according to one embodiment of the present disclosure.

As shown in FIGS. 8 and 9, the wearable piece 210 comprises a cup body 211 and a cup cover 212, and the cup cover 212 is detachably connected to the cup body 211. The cup cover 212 is connected to the cup body 211 to define the accommodating cavity 210A. The cup cover 212 defines a through hole 212A communicated with the accommodating cavity 210A. The cup body 211 is configured to store the urine and is made of hard or semi-hard materials, such as polyethylene, polypropylene (PP), polyamide, polyester, cellulosic, styrene acrylonitrile copolymer (SAN), acrylic resin, scrylonitrile butadiene styrene copolymers (ABS), or other thermoplastics to ensure shape stability and durability of the cup body 211. An inner wall of the cup body 211 is smooth to reduce urine residue and cleaning difficulty. The cup cover 212 is detachably connected to the cup body 211. The cup cover 212 is connected to the cup body 211 to define the accommodating cavity 210A. The through hole 212A allows the penis to extend into. The cup cover 212 is an elastic piece and is made of silicone, rubber, thermoplastic elastomer (TPE), or other materials. The cup cover 212 is capable of connecting to the penis by a tensioning force, which improves comfort and fitness of the wearable assembly 20 when worn by a user and improves airtightness of a connection between the cup cover 212 and the cup body 211. The cup cover 212 has a certain elasticity, so the cup cover 212 is capable of connecting to the penis only by the tensioning force without any additional fixing device, which is simple to use.

As shown in FIG. 9, the first liquid sensors 220 are fixedly disposed on the cup body 211 and are configured to detect whether there is the urine in the accommodating cavity 210A. The first liquid sensors 220 are installed on a bottom wall or a side wall of the accommodating cavity 210A, so as to ensure that after the urine enters the accommodating cavity 210A, the first liquid sensors 220 are able to quickly sense the urine and send a signal. The first liquid sensor 220 is wiredly or wirelessly (such as wirelessly connected through BLUETOOTH, WI-FI, ZigBee, etc.) connected to the electronic control module 130 to transmit the signal. In some embodiments, the present disclosure further comprises conductive wires 221, and the first liquid sensors 220 are respectively electrically connected to the electronic control module 130 through the conductive wires 221, so connections thereof are stable and reliable, a signal transmission speed is fast, and it is less affected by external interference. The first liquid sensors 220 maybe conductivity sensors.

Figure 10:
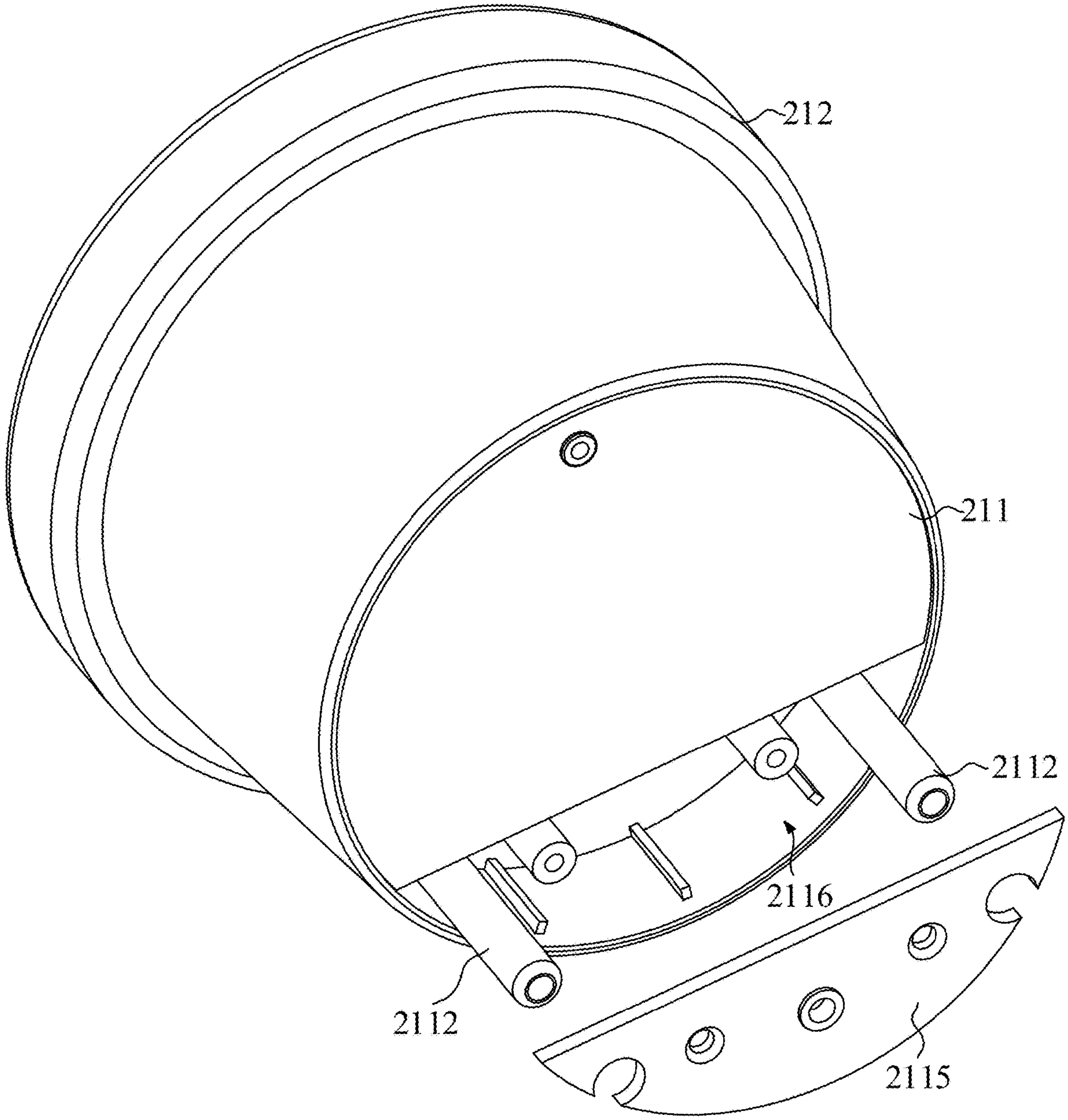
FIG. 10 is another exploded schematic diagram of the wearable piece according to one embodiment of the present disclosure.

Furthermore, as shown in FIG. 10, the cup body 211 further comprises a cover plate 2115. An accommodating groove 2116 is defined on a bottom portion of the cup body 211. It is understood that two first liquid sensors 220 and two conductive wires 221 are provided. Each of the conductive wires 221 need to be forked at a section connected to a corresponding one of the first liquid sensors 220, and the section of each of the conductive wires 221 is accommodated in the accommodating groove 2116, thereby improving aesthetics while protecting the two conductive wires 221. At least portions of the two conductive lines outside the accommodating groove 2116 are wrapped into a cable, so it easier to organize the two conductive wires 221 and improves a structural strength of the two conductive wires 221. The cover plate 2115 covers an opening of the accommodating groove 2116, so that the two conductive wires 221 are at least partially fixed in the accommodating groove 2116, and the two conductive wires 221 are protected. The cover plate 2115 and a main body of the cup body 211 are fixed as a whole by bolt connection, snap connection, etc.

In some embodiments, as shown in FIGS. 1 and 2, the urine collector 1 further comprises fastening pieces 90, and the fastening pieces 90 fix the two suction hoses 230 to the conductive wires 221. It is understood that the fastening pieces 90 are disposed at intervals. The fastening pieces 90 may be integrally formed plastic pieces and each of the fastening pieces 90 comprises three clamping grooves, each of which is configured to clamp a corresponding one of the suction hoses 230 or the cable, so that the suction hoses 230 and the conductive wires are disposed neatly and orderly, avoiding chaos of the suction hoses 230 and the conductive wires.

The suction hoses 230 are connected to the cup body 211 and are made of soft materials, such as but not limited to silicone, rubber, thermoplastic elastomer (TPE) and other materials, so that the suction hoses 230 are able to bent at will for easy use by the user. A liquid inlet end of each of the suction hoses 230 is connected to the cup body 211, and a liquid outlet end of each of the suction hoses 230 is connected to a corresponding one of the suction pumps 120 disposed in the host 10. In this way, when the suction pumps 120 work, the urine is sucked from the accommodating cavity 210A into the urine collecting container 30 through the suction hoses 230.

Based on the urine collector 1 of the embodiments of the present disclosure, when the user urinates, the urine enters the accommodating cavity 210A of the wearable piece 210. When any one of the first liquid sensors 220 senses the urine, the signal is sent to the electronic control module 130. After receiving the signal, the electronic control module 130 immediately controls the two suction pumps 120 to simultaneously work. The two suction pumps 120 generate negative pressure to suck the urine from the accommodating cavity of the wearable piece 210 into the urine collecting container 30 through the suction hoses 230. When the urine is completely sucked into the urine collecting container 30, that is, when the first liquid sensors 220 do not sense the urine, the electronic control module 130 controls the two suction pumps 120 to stop working. The cup cover 212 of the present disclosure is the elastic piece with a certain elasticity, so the cup cover 212 is capable of connecting to the penis only by the tensioning force without any additional fixing device. The urine collector 1 is relatively simple to use and improves the airtightness of the cup body 211 and the cup cover 212, thereby reducing the risk of urine leakage. The urine collecting container 30 of the present disclosure is detachable, which is convenient for a caregiver to pour out the urine stored therein and clean the urine collecting container 30.

In order to facilitate a detachable connection between the cup cover 212 and the cup body 211, a flange 2111 is disposed on a top portion of the cup body 211. The flange 2111 extends in a radial direction of the cup body 211. The cup cover 212 comprises a main body portion 2121 and an extension portion 2122. The extension portion 2122 is connected to an edge of the main body portion 2121 and extended towards one side of the main body portion 2121. An annular groove 2123 is defined on an inner side of the extension portion 2122. The flange 2111 is clamped in the annular groove 2123. It is understood that the cup cover 212 is made of a flexible material and is deformable. When the cup cover 212 needs to be connected to the cup body 211, the flange 2111 is easily inserted into the annular groove 2123 by slightly expanding a caliber of the extension portion 2122, thereby achieving a tight seal between the cup cover 212 and the cup body 211 and effectively preventing urine leakage. When the cup cover 212 needs to be detached, the extension portion 2122 is moved to make the flange 2111 separate from the annular groove 2123. In this way, it is easy to assemble and disassemble the cup body 211 and the cup cover 212, thereby facilitating the cleaning of the wearable piece 210.

In some embodiments, as shown in FIG. 8, the cup cover 212 further comprises an extension plate 2124. The extension plate 2124 is connected to a middle portion of the main body 2121. The extension plate 2124 and the main body portion 2121 jointly form a hole wall of the through hole 212A, so as to increase a contact area between the cup cover 212 and the user, and improve the stability and comfort of the wearable piece 210 when worn.

In order to improve the convenience and stability of connections between the suction hoses 230 and the cup body 211, in some embodiments, as shown in FIGS. 7 and 8, first connecting tubes 2112 are disposed on a bottom portion of the cup body 211. The first connecting tubes 2112 extend from the accommodating cavity 210A to an outside. The suction hoses 230 are respectively connected to portions of the first connecting tubes 2112 located outside the accommodating cavity 210A. The first connecting tubes 2112 are disposed at the bottom portion of the cup body 211, so that the urine in the accommodating cavity 210A is allowed to quickly pass through the first connecting tubes 2112 and enter the suction hoses 230. The first connecting tubes 2112 of the present disclosure are integrally formed on the cup body 211. The suction hoses 230 are hoses, which are respectively tightly connected to the first connecting tubes 2112 by interference fit, or by other connection methods such as the snap connection. In this way, the suction hoses 230 are connected to the first connecting tubes 2112 to communicate with the accommodating cavity 210A, which is simple to assemble and has good airtightness.

Furthermore, two suction pumps 120, two first liquid sensors 220, and two suction pumps 120 are provided. When any one of the first liquid sensors 220 senses the liquid, the electronic control module 130 controls the two suction pumps 120 to work simultaneously. Two first connecting tubes 2112 are provided, and the two first connecting tubes 2112 are disposed at intervals at the bottom portion of the cup body 211. Each of the suction hoses 230 is communicated with a corresponding one of the suction pumps 120 and a corresponding one of the first connecting tubes 2112. Each of the first liquid sensors 220 is disposed corresponding to a corresponding one of the first connecting tubes 2112. Liquid inlet ends of the two first connecting tubes 2112 are respectively disposed at a left portion and a right portion of the wearable piece 210, so that when the user turns over, no matter how a body of the user moves, at least one of the suction hoses 230 is kept within a urine suction range, thereby increasing a possibility of urine being sucked out in time and reducing skin irritation, infection or other health problems caused by urine overflow or failure to be sucked out in time.

Figure 11:
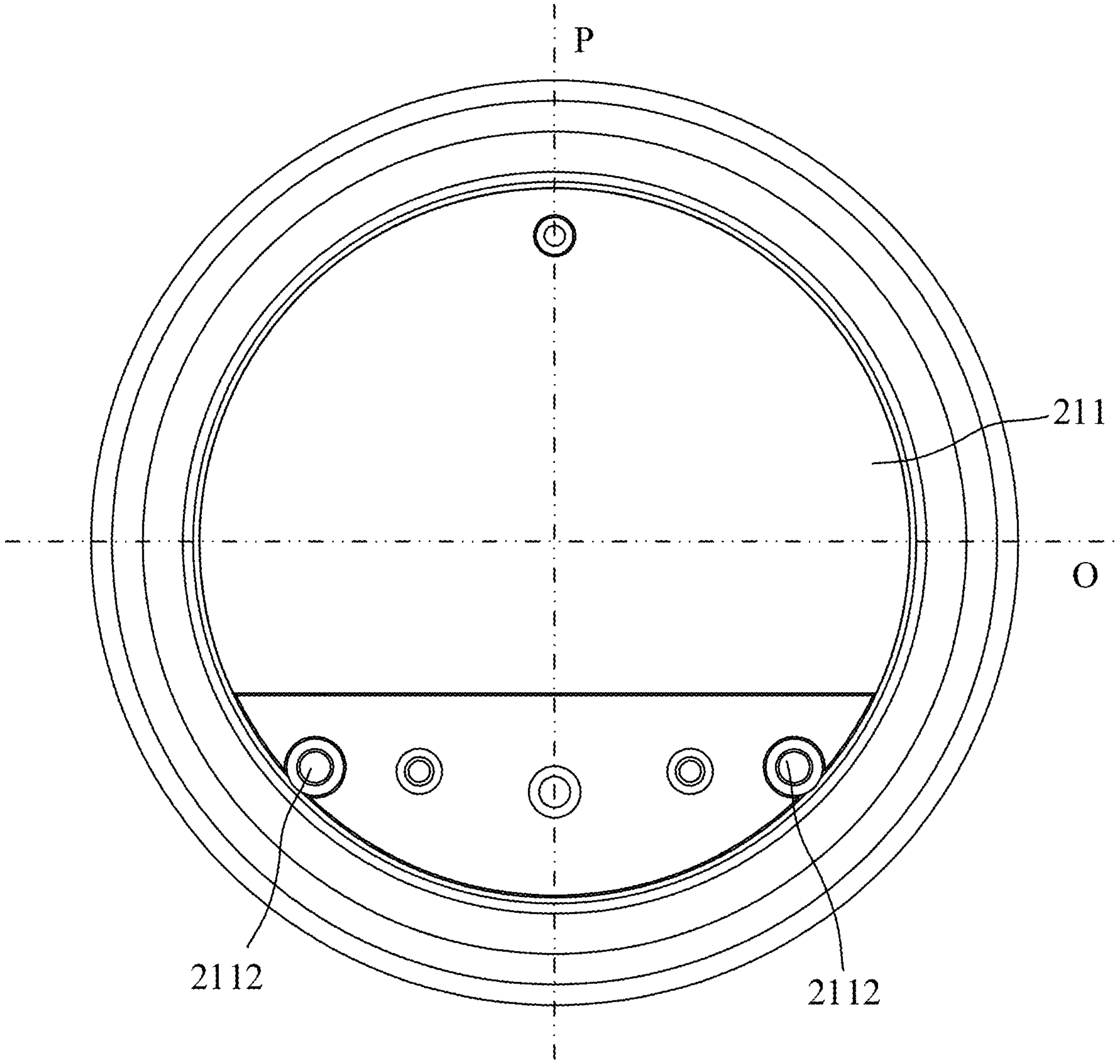
FIG. 11 is a bottom plan schematic diagram of the wearable piece according to one embodiment of the present disclosure.

In some embodiments, as shown in FIG. 11, the cup body 211 defines a first central axis O and a second central axis P with respect to a bottom surface of the cup body 211. The first central axis O is perpendicular to the second central axis P. The two first connecting tubes 2112 are located on one side of the first central axis O and are respectively located on two sides of the second central axis. 2112.

Specifically, when the user wears the wearable piece 210, the two first connecting tubes 2112 are both located at the bottom portion of the cup body 211. In this way, it is convenient to connect the suction hoses 230 to the first connecting tubes 2112. A first one of the first connecting tubes 2112 is disposed at the left portion of the cup body 211, and a second one of the first connecting tubes 2112 is disposed at the right portion of the cup body 211. When the user turns over and causes a first one of the suction hoses 230 close to one side of the cup body to deviate, a second one of the suction hoses 230 close to the other side of the cup body still works normally, thereby avoiding a problem of urine overflowing or the urine not being sucked in time.

Furthermore, the housing 110 comprises second connecting tubes 113 and a third connecting tube 114. The urine collector 1 further comprises two communicating tubes (not shown in the drawings), a urine collecting tube 83, and a three-way joint (not shown in the drawings). Liquid inlet ends of the communicating tubes are respectively communicated with liquid outlet ends of the suction pumps 120. Liquid outlet ends of the communicating tubes are connected to the three-way joint. The three-way joint is connected to the third connecting tube 114. The urine collecting tube 83 is connected to the third connecting tube 114, and the urine collecting tube 83 communicates the urine collecting container 30 to the third connecting tube. A liquid outlet end of the urine collecting tube 83 is located at a top portion of the urine collecting container 30. In this way, the communicating tubes connected to the two suction pumps 120 are communicated with the urine collecting tube 83 through the three-way joint. Thus, only one urine collecting tube 83 is provided, which means that the caregiver only needs to connect one urine collecting tube 83 to the urine collecting container 30 after disassembling or assembling the urine collecting container 30. The present disclosure provides the third connecting tube 114, which facilitates the disassembly of the urine collecting tube 83 and the upper shell 112, so that it is easy to clean and disassemble the urine collecting container 30.

In some embodiments, as shown in FIGS. 8 and 9, the wearable piece 210 further comprises extension tubes 213. A first end of each of the extension tubes 213 is connected to a corresponding one of the first connecting tubes and is located in the accommodating cavity 210A, and a second end of each of the extension tubes 213 extends in a direction toward the cup cover 212. It should be noted that when the user wears the wearable piece 210, a bottom portion of the wearable piece 210 tends to tilt upwards. That is, when the user urinates, the urine tends to gather at a front side of the wearable piece 210, that is, at the cup cover 212. The urine is timely sucked and discharged by providing the extension tubes 213.

Furthermore, since the cup cover 212 is elastic and is easily deformed, a suction force is easily generated on the cup cover 212 during a suction process of the extension tubes 213. In order to prevent the cup cover 212 from blocking liquid inlets of the extension tubes 213, baffles 214 are disposed on the cup body. As shown in FIGS. 8 and 9, the baffles 214 are made of a hard material and the baffles 214 are fixed to the cup body 211. Each of the baffles 214 is at least partially located between the cup cover 212 and the second end of a corresponding one of the extension tubes 213. An interval is fixedly defined between each of the baffles 214 and the second end of the corresponding one of the extension tubes 213. In this way, the baffles 214 act as barriers, which effectively prevent the liquid inlets of the extension tubes 213 from blocking caused by a deformation of the cup cover 212. Each of the baffles 214 comprises two plates disposed at an angle, a first plate thereof is fixedly connected to the cup body 211, and a second plate thereof is configured to separate the cup cover 212 and a corresponding one of the extension tubes 213. In this way, stability of mounting of the baffles 214 is improved.

It is further noted that a liquid position detected by the first liquid sensors 220 is roughly the same as a position of the liquid inlets of the extension tubes 213. In this way, the urine is sucked out in time to avoid urine accumulating to a certain extent in the accommodating cavity 210A before the first liquid sensors 220 sense the urine and cause the suction pumps 120 to start working. Therefore, skin irritation, bacterial growth and other undesirable situations are avoided.

Figure 12:
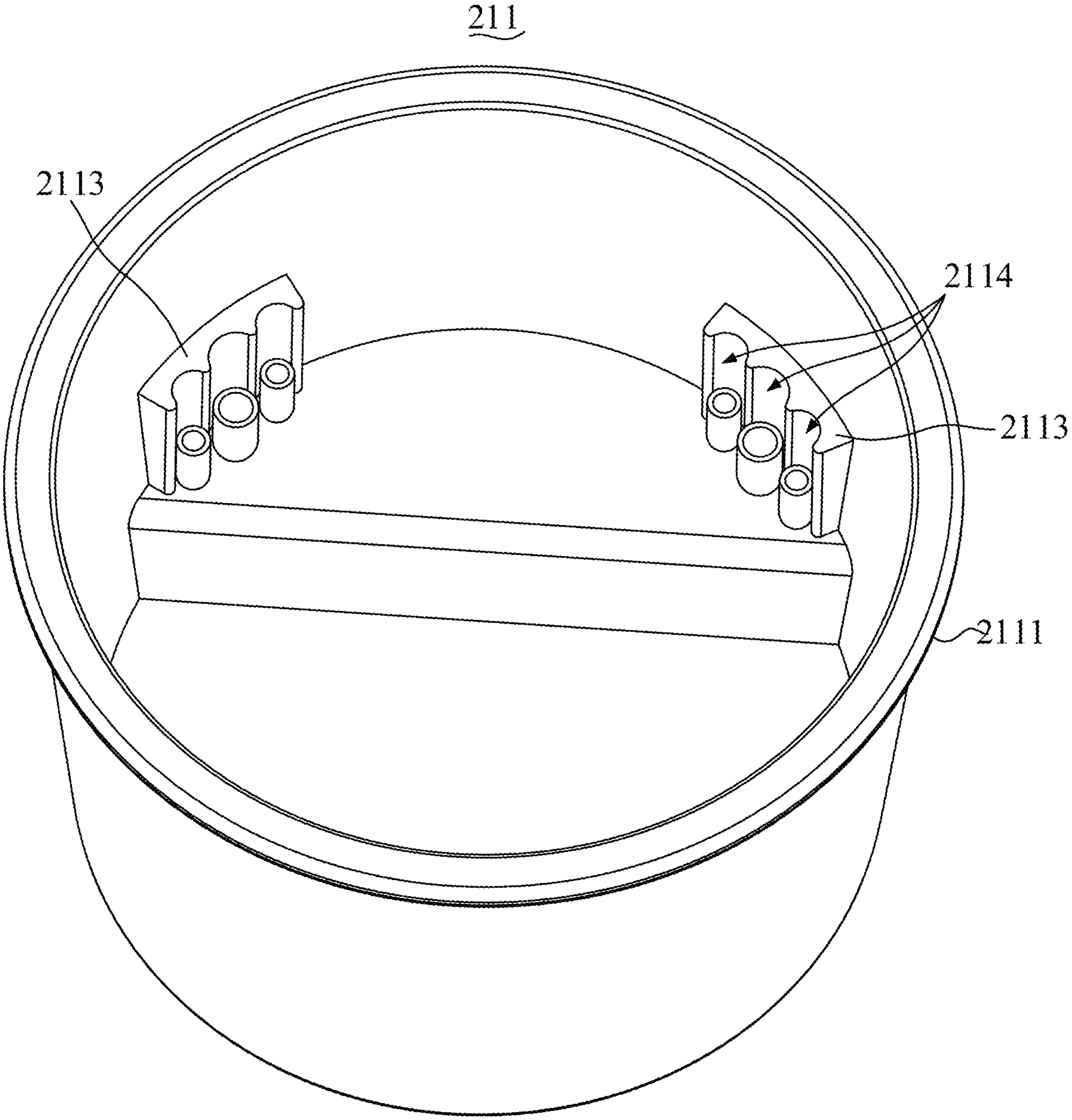
FIG. 12 is a structural schematic diagram of a cup body according to one embodiment of the present disclosure.

In order to facilitate mounting of the extension tubes 213 and the first liquid sensors 220 in the cup body 211, as shown in FIG. 12, mounting portions 2113 are disposed on an inner wall of the cup body 211. The mounting portions 2113 comprise mounting grooves 2114. The extension tubes 213 and the first liquid sensors 220 are mounted in the mounting grooves 2114. Each of the first liquid sensors 220 is located on one side of a corresponding one of the extension tubes 213. The mounting portions 2113 may be integrally formed on the cup body 211 to improve mounting efficiency of the extension tubes 213 and the first liquid sensors 220.

Figure 5:
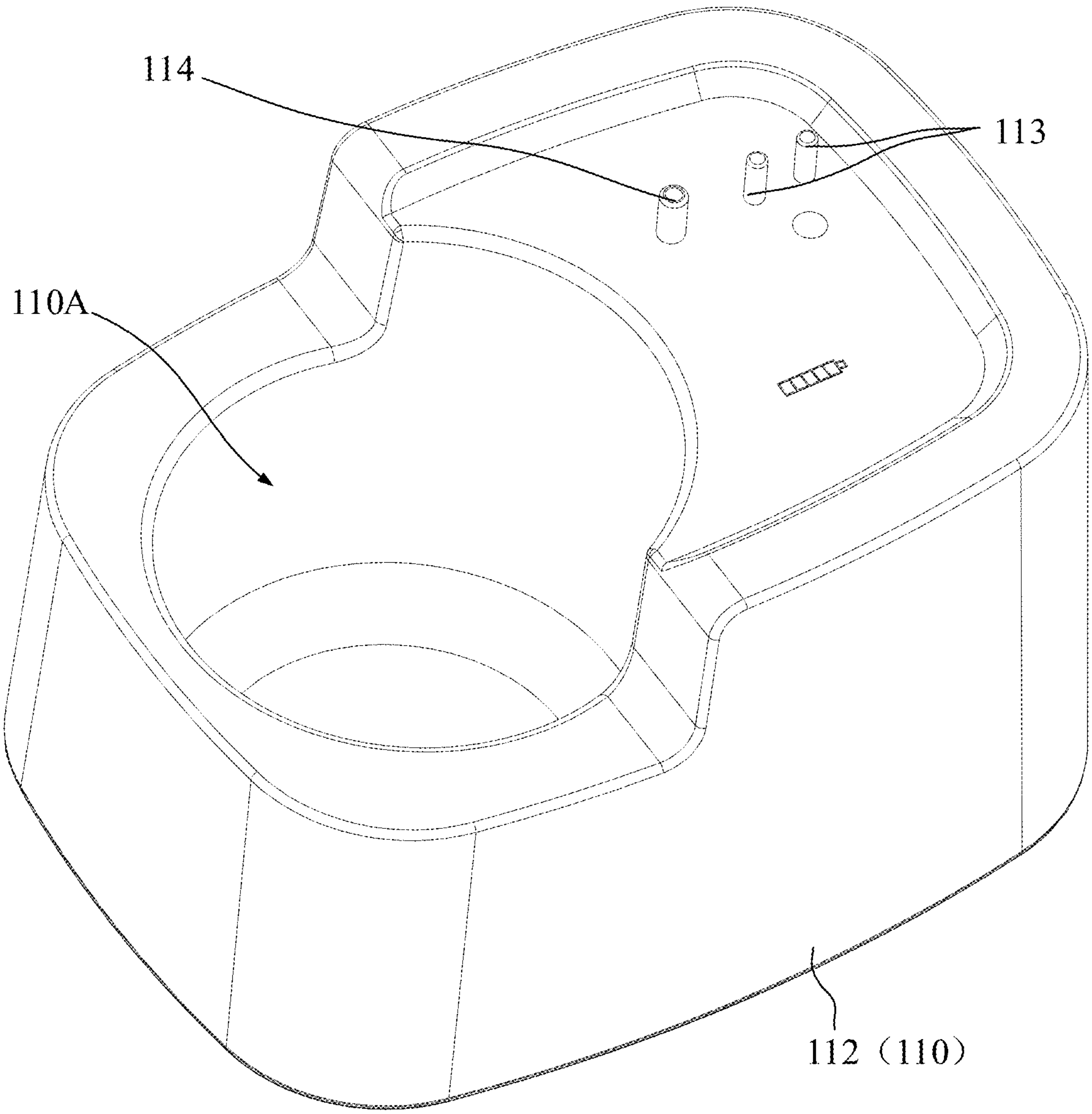
FIG. 5 is a structural schematic diagram of a housing according to one embodiment of the present disclosure.
Figure 6:
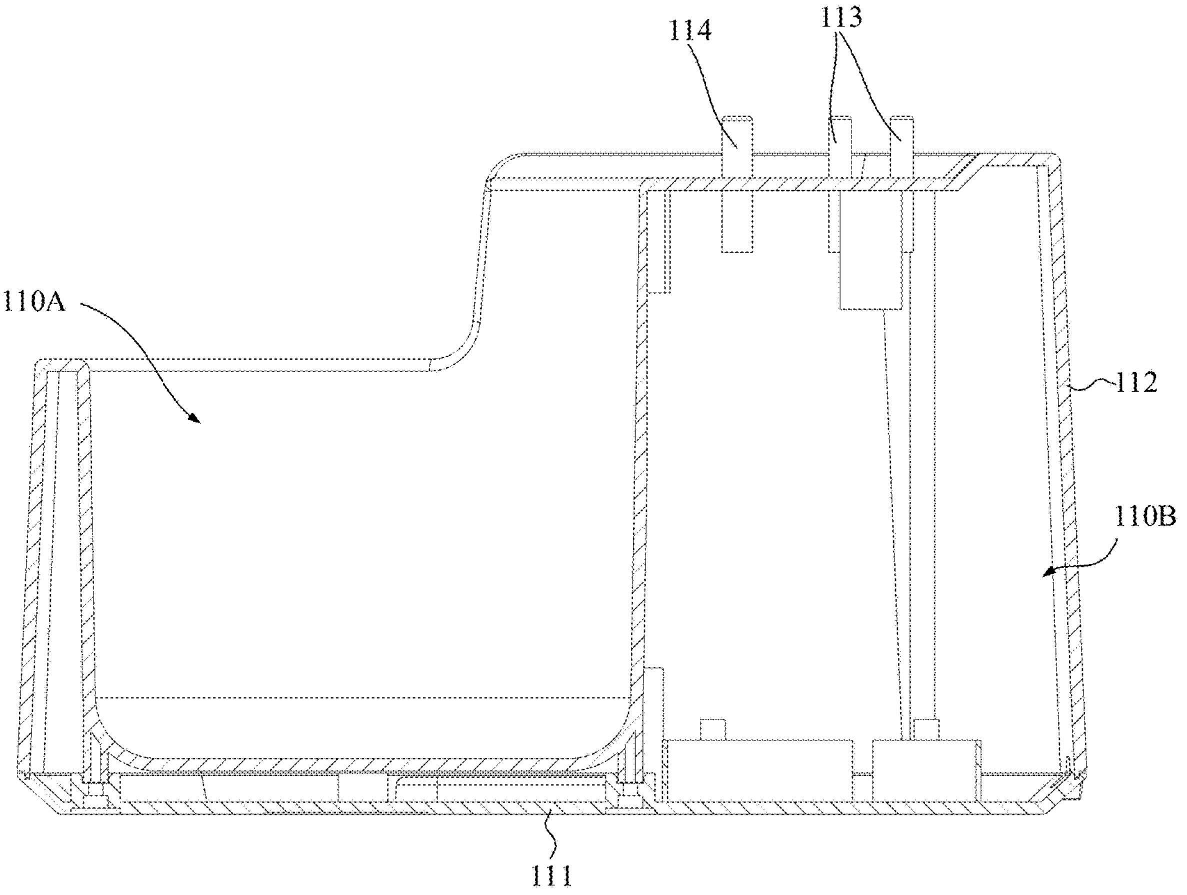
FIG. 6 is a cross-sectional schematic diagram of the housing according to one embodiment of the present disclosure.

In order to facilitate a detachable connection between the urine collecting container 30 and the housing 110, in some embodiments, as shown in FIGS. 5 and 6, the housing 110 defines a receiving groove 110A, and the urine collecting container 30 is detachably mounted in the receiving groove 110A. A size and a shape of the receiving groove 110A are matched with a bottom portion of the urine collecting container 30, ensuring that the urine collecting container 30 is firmly placed in the receiving groove 110A and is not easy to shake or slide. The urine collecting container 30 may be a can. The urine collecting container 30 may comprise a can body and a can cover detachably connected to the can body. By removing the can cover, the urine in the can body is easily poured out and the can body is conveniently cleaned.

In some embodiments, as shown in FIG. 6, the housing 110 comprises a bottom shell 111 and an upper shell 112. The upper shell 112 defines the receiving groove 110A and is enclosed with the bottom shell 111 to form a mounting space 110B. The two suction pumps 120 and the electronic control module 130 are mounted in the mounting space 110B. In this way, a processing and an assembly of the housing 110 are facilitated. The mounting space 110B provides good protection for internal components of the host 10, preventing damage to the internal components by external impact, dust and water vapor. The upper shell 112 and the bottom shell 111 are integrally formed by injection molding. The upper shell 112 and the bottom shell 111 are fixed together by bolt connection, snap connection, etc.

In order to facilitate a connection between the suction hoses 230 and the suction pumps 120, as shown in FIG. 5, the housing 110 comprises the second connecting tubes 113. The second connecting tubes 113 are formed on the upper shell 112. Each of the suction hoses 230 comprises a first hose section 231 and a second hose section 232. The first hose section 231 of each of the suction hoses 230 is communicated with a corresponding one of the first connecting tubes 2112 and a corresponding one of the second connecting tubes 113. The second hose section 232 of each of the suction hoses 230 is communicated with a corresponding one of the second connecting tubes 113 and a corresponding one of the suction pumps 120. Both of the first hose section 231 of each of the suction hoses 230 and the second hose section 232 of each of the suction hoses 230 are detachably connected to the corresponding one of the second connecting tubes, In this way, each first hose section 231 located at an upper portion of the upper shell 112 and the wearable piece 210 are allowed to be disassembled together, making the wearable assembly easy to clean and replace.

In some embodiments, as shown in FIGS. 3 and 4, a second liquid sensor 40 is disposed in the urine collecting container 30, the second liquid sensor 40 is configured to monitor a volume of the urine in the urine collecting container 30 in real time. The second liquid sensor 40 is electrically connected to the electronic control module 130. When the urine in the urine collecting container 30 reaches a predetermined capacity threshold, the second liquid sensor 40 sends a reminding signal to the electronic control module 130, and the electronic control module 130 sends the reminding signal through an external device or to the user terminal to remind the caregiver. Further, the host 10 comprises an alarm (not shown in the drawings). The alarm is electrically connected to the electronic control module 130, and the electronic control module 130 is configured to control the alarm to work when the second liquid sensor 40 detects the liquid. The alarm is configured to prompt the user by sound, light or other forms.

In some embodiments, a total capacity of the urine collecting container 30 is not less than 1830 milliliter (mL) and not greater than 2200 mL, which not only ensures sufficient urine collection capacity, but also avoids inconvenience of carrying and cleaning the urine collecting container 30 if the urine collecting container 30 being too large. The electronic control module 130 is configured to control the alarm to work when the second liquid sensor 40 detects that a volume of the liquid in the urine collecting container 30 is 75% to 85% of the total capacity of the urine collecting container 30. In this way, the caregiver is reminded in time before the urine is about to overflow, and sufficient time is reserved for the caregiver to avoid a problem of urine leakage and overflow.

Furthermore, an exhaust tube 310 is disposed on a top portion of the urine collecting container 30, the exhaust tube 310 communicates an interior of the urine collecting container 30 with an outside of the urine collecting container 30. The exhaust tube 310 ensures that pressure inside and outside the urine collecting container 30 is balanced, so as to avoid the urine leakage or system damage due to pressure difference. The exhaust tube 310 may be a straight tube and may extend upward. At this time, a protective cover is disposed on a top portion of the exhaust tube 310, and the protective cover keeps the exhaust tube 310 unobstructed, preventing the water or the dust from entering the exhaust tube 310, so the exhaust tube 310 is not blocked. In some alternative embodiments, the exhaust tube 310 may be a bending tube, that is, an opening of the exhaust tube 310 extends in a horizontal direction, so that the water and the dust are not easy to fall into the exhaust tube 310.

In some embodiments, as shown in FIG. 4, the urine collector 1 further comprises a battery 50. The battery 50 is configured to supply power to the electronic control module 130, the suction pumps 120, and the first liquid sensors 220. The battery 50 may be a lithium battery and is allowed to be repeatedly charged and discharged, thereby achieving a flexibility use in different scenarios. Whether at home, in the hospital, in a rehabilitation institution, or outdoor environment, the user is able to easily carry and use the urine collector 1.

In some embodiments, the urine collector 1 further comprises a display device. The display device is electrically connected to the electronic control module 130. The display device is configured to indicate a power level of the battery 50. In the present disclosure, the display device is an indicator light 60, and the indicator light 60 indicates different power levels by emitting lights of different colors. For example, green light indicates sufficient power, yellow light indicates medium power, and red light indicates low power or indicates that the battery needs to be charged. The lights in different colors allow the user to understand a power status of the battery 50 at a glance. Alternatively, the indicator light 60 comprises lamp beads, and different power levels are indicated by controlling different numbers of the lamp beads to emit light. For example, when all the lamp beads are on, it means that the battery is full, and as the power decreases, some of the lamp beads are gradually turned off, which also provides an intuitive power indication. In some other embodiments, the display device may be a display panel configured to display a remaining power of the battery 50 in numbers or graphics.

To improve the airtightness of the upper shell 112, the upper shell 112 may comprise a light-emitting area to allow the light of the indicator light 60 to be emitted outwardly. Of course, the upper shell 112 may comprise a mounting hole, and a light board of the indicator light 60 is mounted in the mounting hole, and the present disclosure is not limited thereto.

In some embodiments, as shown in FIGS. 2 and 4, the urine collector 1 further comprises a power adapter 71 and a button 72. The power adapter 71 is configured to connect to an external power source to provide power to the electronic control module 130, the suction pumps 120, and the first liquid sensors 220. The power adapter 71 is configured to convert a voltage in a range of 240-110V to 5V, and the voltage in the range of 240-110V is widely applied and covers household voltage standards in most countries of the world, thereby improving international versatility and applicability of the urine collector. By converting the voltage into a stable 5V output voltage through the power adapter 71, a stable operation of an internal circuit of the urine collector is ensured to avoid failures or damage caused by voltage fluctuations. It is understood that the power adapter 71 is also able to store electricity for the battery 50. The button 72 is mounted on an outer surface of the housing 110 and is electrically connected to the electronic control module 130. For instance, the button 72 is mounted on an outer surface of the upper shell 112. The button 72 allows the user to control a switch, a working mode, or check the power level of the urine collector 1 by a simple pressing action.

In the drawings of the embodiments, the same or similar numbers correspond to the same or similar components; in the description of the present disclosure, it should be understood that terms such as "upper", "lower", "left", "right" etc., indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A urine collector, comprising:
- a host,
- a urine collecting container; and
- a wearable assembly
- wherein the host comprises a housing, suction pumps, and an electronic control module, the suction pumps and the electronic control module are mounted in the housing, the suction pumps are controlled by the electronic control module, and the urine collecting container is detachably mounted on the housing and is communicated with the suction pumps;
- wherein the wearable assembly comprises a wearable piece, suction hoses, and first liquid sensors, the wearable piece comprises a cup body and a cup cover, the cup cover is detachably connected to the cup body, the cup cover is connected to the cup body to define an accommodating cavity, the cup cover is an elastic piece and defines a through hole, the through hole allows a penis to extend into, the cup cover is capable of connecting to the penis by a tensioning force, the first liquid sensors are fixedly disposed on the cup body, and the suction hoses are connected to the cup body;
- wherein the electronic control module is configured to control the suction pumps to work simultaneously when the first liquid sensors sense a liquid.

2. The urine collector according to claim 1, wherein a flange is disposed on a top portion of the cup body, the flange extends in a radial direction of the cup body, the cup cover comprises a main body portion and an extension portion, the extension portion is connected to an edge of the main body portion and extended towards one side of the main body portion, an annular groove is defined on an inner side of the extension portion, and the flange is clamped in the annular groove.

3. The urine collector according to claim 2, wherein first connecting tubes are disposed on a bottom portion of the cup body, and the suction hoses are respectively connected to the first connecting tubes to be communicated with the accommodating cavity.

4. The urine collector according to claim 3, wherein the wearable piece further comprises extension tubes and baffles, a first end of each of the extension tubes is connected to a corresponding one of the first connecting tubes and is located in the accommodating cavity, and a second end of each of the extension tubes extends in a direction toward the cup cover;
- wherein the baffles are fixed to the cup body; each of the baffles is at least partially located between the cup cover and the second end of a corresponding one of the extension tubes, an interval is fixedly defined between each of the baffles and the second end of the corresponding one of the extension tubes.

5. The urine collector according to claim 4, wherein mounting portions are disposed on an inner wall of the cup body, the mounting portions comprise mounting grooves, the extension tubes and the first liquid sensors are mounted in the mounting grooves, and each of the first liquid sensors is located on one side of a corresponding one of the extension tubes.

6. The urine collector according to claim 4, wherein two suction pumps, two first liquid sensors, and two suction pumps are provided, and when any one of the first liquid sensors senses the liquid, the electronic control module controls the two suction pumps to work simultaneously;
- wherein two first connecting tubes are provided, and the two first connecting tubes are disposed at intervals at the bottom portion of the cup body, the cup body defines a first central axis and a second central axis with respect to a bottom surface of the cup body, the first central axis is perpendicular to the second central axis, the two first connecting tubes are located on one side of the first central axis and are respectively located on two sides of the second central axis, each of the suction hoses is communicated with a corresponding one of the suction pumps and a corresponding one of the first connecting tubes;
- wherein each of the first liquid sensors is disposed corresponding to a corresponding one of the first connecting tubes.

7. The urine collector according to claim 6, wherein the housing comprises second connecting tubes and a third connecting tube, and the urine collector further comprises two communicating tubes, a urine collecting tube, and a three-way joint;
- wherein liquid inlet ends of the communicating tubes are respectively communicated with liquid outlet ends of the suction pumps, liquid outlet ends of the communicating tubes are connected to the three-way joint, the three-way joint is connected to the third connecting tube, the urine collecting tube is connected to the third connecting tube, and the urine collecting tube communicates the urine collecting container to the third connecting tube.

8. The urine collector according to claim 2, wherein the urine collector further comprises conductive wires, and the first liquid sensors are electrically connected to the electronic control module through the conductive wires.

9. The urine collector according to claim 8, wherein the first liquid sensors are conductivity sensors; and/or,
- the urine collector further comprises fastening pieces, and the fastening pieces fix the two suction hoses to the conductive wires.

10. The urine collector according to claim 8, wherein the cup body further comprises a cover plate, an accommodating groove is defined on a bottom portion of the cup body, two conductive wires are provided, the cover plate covers an opening of the accommodating groove, so that the two conductive wires are at least partially fixed in the accommodating groove,
- wherein one end of each of the conductive wires are electrically connected to a corresponding one of the first liquid sensors, and at least portions of the two conductive lines outside the accommodating groove are wrapped into a cable.

11. The urine collector according to claim 1, wherein the cup cover comprises a main body portion and an extension plate connected to one side of the main body portion, and the extension plate and the main body portion jointly form a hole wall of the through hole.

12. The urine collector according to claim 1, wherein a second liquid sensor is disposed in the urine collecting container, and the second liquid sensor is electrically connected to the electronic control module.

13. The urine collector according to claim 12, wherein the host further comprises an alarm, the alarm is electrically connected to the electronic control module, and the electronic control module is configured to control the alarm to work when the second liquid sensor detects the liquid.

14. The urine collector according to claim 13, wherein a total capacity of the urine collecting container is not less than 1830 milliliter (mL) and not greater than 2200 mL, and the electronic control module is configured to control the alarm to work when the second liquid sensor detects that a volume of the liquid in the urine collecting container is 75% to 85% of the total capacity of the urine collecting container.

15. The urine collector according to claim 1, wherein an exhaust tube is disposed on a top portion of the urine collecting container, the exhaust tube communicates an interior of the urine collecting container with an outside of the urine collecting container.

16. The urine collector according to claim 1, wherein the housing defines a receiving groove, and the urine collecting container is detachably mounted in the receiving groove.

17. The urine collector according to claim 16, wherein the housing comprises a bottom shell and an upper shell, the upper shell defines the receiving groove and is enclosed with the bottom shell to form a mounting space, and the suction pumps and the electronic control module are mounted in the mounting space.

18. The urine collector according to claim 1, wherein the housing comprises second connecting tubes, each of the suction hoses comprises a first hose section and a second hose section, the first hose section of each of the suction hoses is communicated with the second hose section of each of the suction hoses through a corresponding one of the second connecting tubes, and both of the first hose section of each of the suction hoses and the second hose section of each of the suction hoses are detachably connected to the corresponding one of the second connecting tubes.

19. The urine collector according to claim 1, wherein the urine collector further comprises a battery, a display device, and a button, the battery is configured to supply power to the electronic control module, the suction pumps, and the first liquid sensors; the display device is electrically connected to the electronic control module, and the display device is configured to indicate a power level of the battery; and the button is mounted on an outer surface of the housing and is electrically connected to the electronic control module.

20. The urine collector according to claim 19, wherein the display device is an indicator light, and the indicator light indicates different power levels by emitting lights of different colors; or the indicator light comprises lamp beads, and different power levers are indicated by controlling different numbers of the lamp beads to emit light.

* * * * *